US010793480B2

(12) United States Patent
Maiti et al.

(10) Patent No.: US 10,793,480 B2
(45) Date of Patent: Oct. 6, 2020

(54) PROCESS FOR THE PREPARATION OF POTASSIC FERTILISER FROM ALCOHOL DISTILLERY EFFLUENT (SPENT WASH)

(71) Applicant: COUNCIL OF SCIENTIFIC & INDUSTRIAL RESEARCH, New Delhi (IN)

(72) Inventors: Pratyush Maiti, Gujarat (IN); Soumya Haldar, Gujarat (IN); Subarna Maiti, Gujarat (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 16/468,603

(22) PCT Filed: Feb. 26, 2018

(86) PCT No.: PCT/IN2018/050100
§ 371 (c)(1),
(2) Date: Jun. 11, 2019

(87) PCT Pub. No.: WO2018/154607
PCT Pub. Date: Aug. 30, 2018

(65) Prior Publication Data
US 2020/0010376 A1   Jan. 9, 2020

(30) Foreign Application Priority Data

Feb. 27, 2017  (IN) .............................. 201711006780

(51) Int. Cl.
*C01B 25/30* (2006.01)
*C01B 11/08* (2006.01)
(Continued)

(52) U.S. Cl.
CPC ............ *C05B 11/08* (2013.01); *C01B 25/301* (2013.01); *C05B 7/00* (2013.01); *C05F 5/008* (2013.01)

(58) Field of Classification Search
None
See application file for complete search history.

(56) References Cited

U.S. PATENT DOCUMENTS 1,357,120 A * 10/1920 Sadtler ..................... C05B 7/00
                                                            423/306
1,400,192 A   12/1921 Witakaer
(Continued)

FOREIGN PATENT DOCUMENTS

| CN | 101781138 B | 7/2012 |
| EP | 1094047 A1 | 4/2001 |
| WO | WO 2016/059651 A1 | 4/2016 |

OTHER PUBLICATIONS

May 17, 2018 International Search Report issued in International Patent Application No. PCT/IN2018/050100.
(Continued)

*Primary Examiner* — Wayne A Langel
(74) *Attorney, Agent, or Firm* — Arent Fox LLP

(57) ABSTRACT

The present invention provides a method for the preparation of multi-nutrient potassic fertilizer, by recovering potassium from sugarcane molasses based alcohol distillery effluent (commonly known as 'spent wash'). The process involves pre-treatment of spent wash to clarify the aqueous phase and utilization of the treated spent wash in production of potassic fertilizer. The present invention enables utilisation of spent wash for recovery of value-added product (viz., potash fertiliser of >99% purity) and improves ease of 'Zero Liquid Discharge' compliance by subjecting the relatively benign process effluent to industrially practiced techniques for water recovery and salt reclamation.

9 Claims, 1 Drawing Sheet

(51) Int. Cl.
*C05F 5/00* (2006.01)
*C05B 7/00* (2006.01)
*C05B 11/08* (2006.01)

(56) References Cited

U.S. PATENT DOCUMENTS

| | | | | |
|---|---|---|---|---|
| 4,576,627 A * | 3/1986 | Hughes | ............... | C05B 7/00 423/306 |
| 5,127,933 A * | 7/1992 | Hallett | ............... | C05B 17/00 435/244 |
| 6,042,629 A * | 3/2000 | McGarrity | ............... | B08B 9/027 71/25 |
| 6,274,105 B1 * | 8/2001 | Vorage | ............... | C01B 25/30 423/181 |
| 2008/0102502 A1 | 5/2008 | Foody et al. | | |
| 2010/0311584 A1 * | 12/2010 | Josef | ............... | C01B 25/306 504/101 |

OTHER PUBLICATIONS

May 17, 2018 Written Opinion issued in International Patent Application No. PCT/IN2018/050100.

* cited by examiner

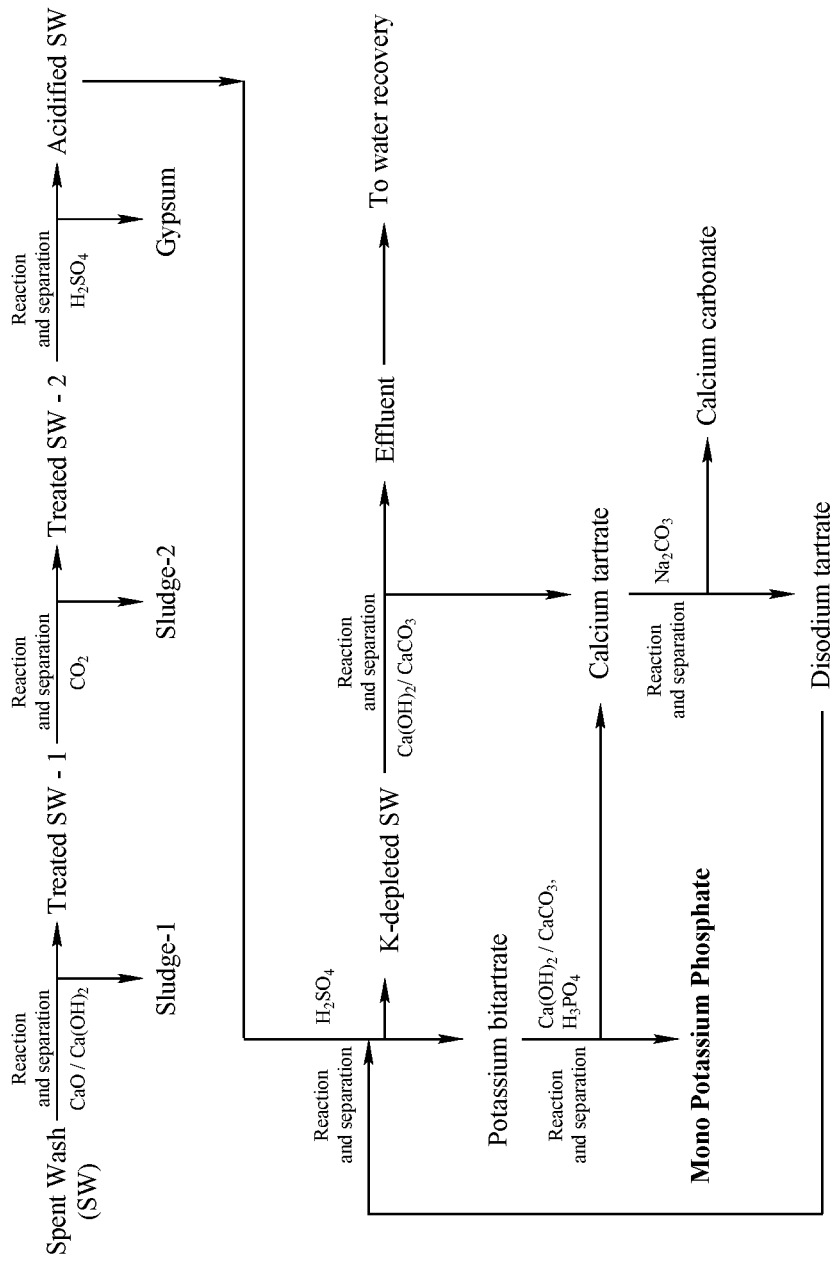

PROCESS FOR THE PREPARATION OF POTASSIC FERTILISER FROM ALCOHOL DISTILLERY EFFLUENT (SPENT WASH)

CROSS-REFERENCE TO RELATED APPLICATION

This application is a 35 U.S.C. § 371 National Phase Application of PCT Application No. PCT/IN2018/050100 filed Feb. 26, 2018, which claims priority to IN Application No. 201711006780 filed Feb. 27, 2017. The disclosure of these prior applications are hereby incorporated by reference herein in their entirety.

FIELD OF THE INVENTION

The present invention relates to a process for the preparation of multi-nutrient potassic fertilizer, more specifically mono potassium phosphate, by recovering potassium from sugarcane molasses based alcohol distillery effluent (commonly known as 'spent wash'). In particular, the process involves pre-treatment of spent wash to clarify aqueous phase and utilization of the treated spent wash in production of potassic fertilizer. In a broader perspective, the present invention improves sustainability through valorization of commercially important constituents of process effluent while opening up opportunities of achieving 'zero liquid discharge' (ZLD) compliance.

BACKGROUND OF THE INVENTION AND DESCRIPTION OF PRIOR ART

Sugarcane molasses based alcohol distillery effluent (commonly known as 'spent wash') is an extremely complex system and poses significant challenge in developing effective environmental remediation protocol. While use of this effluent in land application so as to take advantage of nutrient value of the constituents K, N and P have been reported in the literature and put in practice, efforts have also been made to recover potassium from the effluent.

Reference may be made to U.S. Pat. No. 1,400,192 which teaches about a process for precipitating potassium from distillery waste by using hexafluorosilicic acid as precipitant. However, use of hexafluorosilicic acid leads to fluoride contamination in effluent stream necessitating additional input for environmental management of the effluent.

Reference may be made to section 5.1.6.3 of Indian Standard IS:8032-1976 (reaffirmed 2003) "GUIDE FOR TREATMENT OF DISTILLERY EFFLUENTS", which teaches about process for the recovery of potash from distillery spent wash. The process involves neutralization of spent wash followed by concentration and incineration to produce "spent wash coke" which on combustion produces ash. This ash is then leached with water. The leachate upon neutralization with sulphuric acid and subsequent crystallization yields solid mixture of potassium sulphate and potassium chloride. However, this mixed salt is contaminated with ca. 5% sodium salts and may not meet the prevailing standards for use as fertilizer. Additionally, due to high probability of organic fouling and slag formation, evaporation and incineration performance is likely to be compromised on prolonged operation.

Reference may be made to CN101781138 B wherein potassium is selectively recovered from molasses based alcohol distillery waste through ion exchange process using ammonium modified natural zeolite. Subsequently the ion exchange column is eluted with solution of ammonium salt (viz., nitrate/sulphate chloride etc.) to release potassium as aqueous solution of corresponding ammonium salt solution. This solution is then concentrated to produce solid K-N fertiliser. However, in this process, during ion exchange ammonia is continually lost in K-depleted distillery waste, which adversely affects process economics as well as quality of process effluent.

Reference may be made to PCT publication number WO/2013/150363 which teaches about a method for selectively precipitating potassium from aqueous solution, e.g., schoenite end liquor, using tartaric acid as precipitant. However, due to interaction of constituent solutes, particularly organics, straightforward implementation of this process in spent wash results in highly coloured and impure potash salt.

Reference may be made to PCT publication number WO/2017/042832 which teaches about a method for potash recovery from biomethanated spent wash with concomitant environmental remediation of effluent. However, presumably due to presence of complex organics in spent wash, pretreatment technique—as described in the above process—does not aid clarification of spent wash & subsequently results in potash salt contaminated with organic impurities.

Thus, keeping in view the drawbacks of the hitherto reported prior art, the inventors of the present invention realized that there exists a dire need to devise a method for the production of multi-nutrient potassic fertilizer, of commercially acceptable purity, by recovering potassium from alcohol distillery spent wash.

OBJECTS OF THE INVENTION

The main objective of the present invention is therefore to provide a process for the production of multi-nutrient potassic fertilizer, by recovering potassium from spent wash, which obviates the drawbacks of the hitherto reported prior art.

Another object of the present invention is to recover potassium from treated and clarified spent wash, as multi-nutrient potassic fertilizers viz., mono potassium phosphate.

Still another object of the present invention is to produce mono potassium phosphate in commercially acceptable quality.

SUMMARY OF THE INVENTION

The present invention provides a process for the preparation of multi-nutrient potassic fertilizer, more specifically mono potassium phosphate, by recovering potassium from spent wash.

The process comprises the following major steps:
(i) lime treatment of spent wash till pH of reaction mixture is greater than 12.0;
(ii) reacting the supernatant/filtrate obtained from step (i) with carbon dioxide till the pH is in the range of 8.0 to 9.0 to reduce calcium content in the solution;
(iii) reacting the supernatant/filtrate obtained from step (ii) with sulphuric acid to achieve a pH of less than 2.5 so as to minimise calcium content in solution;
(iv) reacting the supernatant/filtrate obtained from step (iii) with tartaric acid and sodium hydroxide to effect precipitation of potassium bitartrate while maintaining the pH in the range of 2.5 to 3.1;
(v) treating the supernatant/filtrate obtained from step (iv) with calcium oxide/carbonate till the pH comes in the range of 5.0 to 6.0 to recover residual tartrate as calcium tartrate;

(vi) discharging the supernatant/effluent obtained from step (v) as process effluent for subsequent environmental remediation/water recovery/salt reclamation;

(vii) reacting the potassium bitartrate obtained from step (iv) with calcium oxide/hydroxide/carbonate and phosphoric acid to produce solution of mono potassium phosphate, while precipitating calcium tartrate;

(viii) crystallising white crystalline mono potassium phosphate with purity >99% through cooling/evaporating the supernatant/filtrate obtained from step (vii);

(ix) treating the calcium tartrate precipitate obtained from step (v) & step (vii) with aqueous solution of sodium carbonate at a temperature in the range of 50 to 80° C. to generate disodium tartrate solution, while precipitating calcium carbonate;

(x) using the disodium tartrate solution obtained from step (ix) for further process cycles in the reaction in step (iv) with additional quantity of sulphuric acid for in-situ generation of bitartrate ions;

(xi) using the calcium carbonate obtained from step (ix) for further process cycles in the reactions in step (v) & step (vii).

In an embodiment of the present invention the pH of the reaction mixture in step (i) is preferably 12.5-13.5.

In another embodiment of the present invention, the lime treatment results in clarification of spent wash.

In still another embodiment of the present invention, the potassium bitartrate precipitation is effected by maintaining mole ratio of tartaric acid and potassium content in treated spent wash in the range of 1.0 to 1.1.

In yet another embodiment of the present invention, the potassium bitartrate is reacted with equimolar quantity of lime and phosphoric acid to produce mono potassium phosphate.

In still another embodiment of the present invention, the insoluble tartrate salt is converted into soluble tartrate salt by reacting calcium tartrate with sodium carbonate.

In yet another embodiment of the present invention, the tartaric acid is recycled as disodium tartrate.

In still another embodiment of the present invention, other multi-nutrient potassic fertilisers, viz., potassium sulphate, potassium nitrate etc., can also be produced by using appropriate acids in place of phosphoric acid.

In yet another embodiment of the present invention, the spent wash is utilised for production of pure potassic chemicals.

In still another embodiment of the present invention, the purging of carbon dioxide in step (ii) is done till the pH reaches 8.5.

In yet another embodiment of the present invention, the pH in step (iv) is maintained in the range of 2.8 to 2.9.

In a further embodiment, the present invention provides a process for the preparation of multi-nutrient potassic fertiliser, more specifically mono potassium phosphate, by recovering potassium from spent wash, such process comprising:

(i) addition of lime in spent wash under stirring, till pH of the sludge is greater than 12, more preferably greater than 12.5;

(ii) purging of carbon dioxide gas in the supernatant from step (i) till pH is in the range of 8.0-9.0, more preferably 8.5;

(iii) addition of sulphuric acid in the supernatant from step (ii) till pH is less than 2.5;

(iv) addition of tartaric acid in the supernatant from step (iii), under stirring, followed by addition of sodium hydroxide to maintain pH at 2.5-3.1, more preferably at 2.8-2.9;

(v) addition of calcium carbonate in the supernatant from step (iv), under stirring, till pH is ca. 5-6;

(vi) addition of calcium oxide/hydroxide/carbonate and phosphoric acid in aqueous suspension of the potassium bitartrate, solid residue obtained from step (iv), under stirring;

(vii) evaporation of the supernatant from step (vi) to produce solid mono potassium phosphate crystals;

(viii) addition of the calcium tartrate solids [residue from step (v) & step (vi)] in to aqueous solution of sodium carbonate, under stirring, maintaining the reaction temperature at 50-80° C.;

(ix) addition of the supernatant from step (viii) in step (iv) in place of tartaric acid and adjusting pH with sulphuric acid;

(x) using calcium carbonate, the solid residue from step (viii) in step (vi).

BRIEF DESCRIPTION OF THE ACCOMPANYING DRAWINGS

FIG. 1 represents the scheme of the process for preparation of mono potassium phosphate, by recovering potassium from spent wash.

Inventive Steps of the Present Invention a) The main inventive step is the development of a method for utilization of spent wash for production of mono potassium phosphate with >99% purity.

b) Another inventive step is to effect clarification of raw spent wash by lime treatment.

c) Yet another inventive step is to produce mono potassium phosphate from potassium bitartrate.

d) Still another inventive step is to recycle tartaric acid as disodium tartrate.

DETAILED DESCRIPTION OF THE INVENTION

The present invention provides a process for the preparation of multi-nutrient potassic fertilizer, more specifically mono potassium phosphate, by recovering potassium from treated and clarified spent wash. The produced mono potassium phosphate is of commercially acceptable quality. The developed process comprises the following steps:

(i) Addition of lime in spent wash under stirring, till pH of the slurry is greater than 12;

(ii) Centrifugation/filtration of the resultant slurry to obtain clear liquid and carbon-rich slurry/sludge;

(iii) Purging of carbon dioxide gas in the supernatant/filtrate obtained from step (ii) till pH is in the range of 8.0 to 9.0;

(iv) Centrifugation/filtration of the resultant slurry to obtain clear liquid and solid calcium carbonate;

(v) Addition of sulphuric acid in the supernatant/filtrate obtained from step (iv) till a pH of less than 2.5 is achieved;

(vi) Centrifugation/filtration of the resultant slurry to obtain clear liquid and solid gypsum;

(vii) Addition of tartaric acid in the supernatant/filtrate obtained from step (vi) under stirring, followed by addition of sodium hydroxide to maintain pH in the range of 2.5 to 3.1;

(viii) Centrifugation/filtration of the resultant slurry to obtain clear liquid and solid potassium bitartrate;

(ix) Addition of calcium carbonate in the supernatant/filtrate obtained from step (viii), under stirring, till the pH in the range of 5 to 6 is achieved;

(x) Centrifugation/filtration of the resultant slurry to obtain clear liquid and solid calcium tartrate;
(xi) discharging the supernatant/effluent obtained from step (x) as process effluent for subsequent environmental remediation/water recovery/salt reclamation;
(xii) Addition of calcium oxide/hydroxide/carbonate and phosphoric acid in aqueous suspension of the potassium bitartrate obtained from step (viii) under stirring;
(xiii) Centrifugation/filtration of the resultant slurry to obtain clear liquid and solid calcium tartrate;
(xiv) Evaporation/cooling of the supernatant/filtrate obtained from step (xiii) to produce solid mono potassium phosphate crystals;
(xv) Addition of the calcium tartrate solids obtained from step (x) & step (xiii) to aqueous solution of sodium carbonate, under stirring;
(xvi) Centrifugation/filtration of the resultant slurry to obtain clear liquid and solid calcium carbonate;
(xvii) Addition of the disodium tartrate solution obtained as supernatant/filtrate in step (xvi), to the reaction in step (vii) in place of tartaric acid and adjusting pH with sulphuric acid;
(xviii) Recycling the solid calcium carbonate obtained from step (xvi) in the reaction process of step (xii).

EXAMPLES

The following examples are given by way of illustration only and therefore should not be construed to limit the scope of the present invention in any manner.

Example 1

1 L spent wash [dark brown, opaque, $K^+$:1.1% (w/v)] was reacted with 50 gm calcium hydroxide [available lime: 81% (w/w)] under stirring. pH of the reaction mixture was 13.25. Stirring was continued for 3 hrs. Upon centrifugation of the resultant slurry, 200 gm wet cake and 0.85 L filtrate [reddish brown, transparent, pH: 12.94, $Ca^{2+}$:1.15%, $K^+$:1.08% (w/v)] was obtained. The wet cake was dried to obtain 100 gm solid (Ca: 18.26%, w/w; gross calorific value: 8.5 MJ/kg).

Example 1 teaches us about the method for clarification of spent wash through partial removal of organics from aqueous phase.

Example 2

Carbon dioxide gas was purged through 1 L of lime treated spent wash, obtained following the procedures of example-1, [reddish brown, transparent, pH: 12.94 $Ca^{2+}$: 1.12%, $K^+$:1.1% (w/v)], under stirring, till pH of the reaction mixture was 8.0. Stirring was continued for 3 hrs. Upon centrifugation of the resultant slurry, 200 gm wet cake and 0.9 L filtrate [reddish brown, transparent, pH: 8.09, $Ca^{2+}$: 0.86%, $K^+$:1.1% (w/v)] was obtained. The wet cake was dried to obtain 100 gm solid (Ca: 18.26%, w/w; gross calorific value: 8.5 MJ/kg).

Example 2 teaches us about the method for reduction of calcium content in lime treated spent wash through carbon dioxide gas purging.

Example 3

18.3 gm concentrated sulphuric acid (purity: 98%) was slowly added in to 1 L treated spent wash, as obtained following the procedures of example-2, [brown, transparent, pH: 8.5, $Ca^{2+}$:0.85%, $K^+$:1.1 (w/v)], under stirring. pH of the reaction mixture was 2.01. Stirring was continued for 3 hrs. Upon filtration of the resultant slurry, 80 gm wet cake and 0.9 L filtrate [brown, transparent, pH: 2.01, $Ca^{2+}$:0.08%, $K^+$:1.1% (w/v)] was obtained. The wet cake was dried to obtain 32 gm gypsum.

Example 3 teaches us about the method to minimise calcium concentration in treated spent wash.

Example 4

32.63 gm tartaric acid and 13.62 gm sodium hydroxide was added in to 0.63 L treated spent wash, as obtained following the procedures of example-3, [brown, transparent, pH: 2.01, $K^+$:1.35% (w/v)], under stirring. pH of the reaction mixture was 2.91. Stirring was continued for 3 hrs. Upon filtration of the resultant slurry, 0.62 L filtrate [K-depleted spent wash, reddish brown colour, transparent, $K^+$:0.34% (w/v)] was obtained along with 48.5 gm wet cake [potassium bitartrate, $K^-$: 12.88%, tartaric acid: 51.3% (w/w)].

Example 4 teaches us about the method for precipitation of potassium bitartrate from treated spent wash through in-situ formation of bitartrate ion.

Example 5

40 gm potassium bitartrate, obtained following the procedures of example-4 and dried, [ICH 17.32%, tartaric acid: 73.37% (w/w)], was added into 0.15 L water under stirring. 14.5 gm hydrated lime (available lime: 90%) and 20.5 gm phosphoric acid (purity: 85%) were added into the potassium bitartrate slurry under stirring. Stirring was continued for 3 hrs. pH of the reaction mixture was 3.37. Upon filtration of the resultant slurry, 0.13 L filtrate [pale yellow, transparent, $K^+$:4.62%, $Ca^{2+}$: 0.02%, tartaric acid: nil (w/v)] was obtained, which upon evaporation yielded white crystals of mono potassium phosphate. The wet cake was dried to obtain 55 gm calcium tartrate [Ca: 14.1%, tartaric acid: 50.3% (w/w)].

Example 5 teaches us about the method to produce mono potassium phosphate from potassium bitartrate.

Example 6

6 gm calcium carbonate was slowly added in to 0.48 mL K-depleted spent wash, obtained following the procedures of example-4 [reddish brown, transparent, pH: 2.98, $K^+$:0.22%, tartaric acid: 0.79% (w/v)], under stirring. pH of the reaction mixture was 4.65. Stirring was continued for 3 hrs. Upon filtration of the resultant slurry, 0.44 mL filtrate [reddish brown, transparent, $K^+$:0.22%, tartaric acid: nil (w/v)] was obtained. The wet cake was dried to obtain 6.86 gm calcium tartrate [tartaric acid: 49.03%, (w/w)].

Example 6 teaches us about the method for recovering residual tartaric acid from K-depleted spent wash.

Example 7

16.5 gm sodium carbonate was dissolved in 150 mL water under stirring. 58 gm calcium tartrate, obtained following the procedures of example-6 [tartaric acid: 36.63% (w/w)] was slowly added into the sodium carbonate solution. Stirring was continued for 3 hours maintaining reaction temperature at 70° C. Upon filtration of the resultant slurry, 0.12 mL filtrate [disodium tartrate solution, pale yellow, transparent, pH: 9.26, tartaric acid: 12.15% (w/v)] was obtained.

Example 7 teaches us about the method for converting solid calcium tartrate into solution of disodium tartrate.

Example 8

100 mL disodium tartrate solution, obtained following the procedures of example-7 [pale yellow, transparent, pH: 9.16, tartaric acid: 12.15% (w/v)] was added into 0.24 L treated spent wash, obtained following the procedures of example-3 [brown, transparent, pH: 2.01, $K^+$:1.35% (w/v)], under stirring. 3.9 mL concentrated sulphuric acid was further added into the reaction mixture to maintain pH at 2.86. Stirring was continued for 3 hrs. Upon filtration of the resultant slurry, 0.31 L filtrate [K-depleted spent wash, reddish brown colour, transparent, $K^+$:0.37% (w/v)] was obtained along with 19.4 gm wet cake [potassium bitartrate, ICH 11.54%, tartaric acid: 45.29% (w/w)].

Example 8 teaches us about the method for recycling tartaric acid as disodium tartrate solution to effect potassium bitartrate precipitation from treated spent wash.

ADVANTAGES OF THE PRESENT INVENTION

The present invention provides a method for production of multi-nutrient potassic fertiliser, more specifically mono potassium phosphate, by recovering potassium from sugarcane molasses based alcohol distillery effluent (commonly known as 'spent wash'), thereby enabling its utilisation as an indigenous and sustainable resource for potassium.

Compared to the quality of salts obtained through evaporation-incineration methods, potassic salts produced in the present invention are much purer (>99%).

Except the reaction for conversion of calcium tartrate into disodium tartrate, the core process of spent wash treatment and subsequent potash recovery, as disclosed in the present invention, operate at ambient temperature (20-35° C.) and does not pose difficulties associated with evaporation-incineration methods (viz., fouling, scaling, corrosion etc.).

The invention claimed is:

1. A process for the preparation of multi-nutrient potassic fertiliser, more specifically mono potassium phosphate, by recovering potassium from spent wash, wherein the said process comprising the following steps:
   (i) lime treatment of spent wash to generate carbon-rich sludge having pH greater than 12.0;
   (ii) reacting the supernatant/filtrate obtained from step (i) with carbon dioxide till the pH is in the range of 8.0 to 9.0 to reduce calcium content in the solution;
   (iii) reacting the supernatant/filtrate obtained from step (ii) with sulphuric acid to achieve a pH of less than 2.5 so as to minimise calcium content in solution;
   (iv) reacting the supernatant/filtrate obtained from step (iii) with tartaric acid and sodium hydroxide to effect precipitation of potassium bitartrate while maintaining the pH in the range of 2.5 to 3.1;
   (v) treating the supernatant/filtrate obtained from step (iv) with calcium oxide/carbonate till the pH comes in the range of 5.0 to 6.0 to recover residual tartrate as calcium tartrate;
   (vi) discharging the supernatant/effluent obtained from step (v) as process effluent for subsequent environmental remediation/water recovery/salt reclamation;
   (vii) reacting the potassium bitartrate obtained from step (iv) with calcium oxide/hydroxide/carbonate and phosphoric acid to produce solution of mono potassium phosphate, while precipitating calcium tartrate;
   (viii) crystallising white crystalline mono potassium phosphate with purity >99% through cooling/evaporating the supernatant/filtrate obtained from step (vii);
   (ix) treating the calcium tartrate precipitate obtained from step (v) & step (vii) with aqueous solution of sodium carbonate at a temperature in the range of 50 to 80 degree C. to generate disodium tartrate solution, while precipitating calcium carbonate;
   (x) using the disodium tartrate solution obtained from step (ix) for further process cycles in the reaction in step (iv) with additional quantity of sulphuric acid for in-situ generation of bitartrate ions;
   (xi) using the calcium carbonate obtained from step (ix) for further process cycles in the reactions in step (v) & step (vii)).

2. The process as claimed in claim 1, wherein lime treatment results in clarification of spent wash.

3. The process as claimed in claim 1, wherein potassium bitartrate precipitation is effected by maintaining mole ratio of tartaric acid and potassium content in treated spent wash in the range of 1.0 to 1.1.

4. The process as claimed in claim 1, wherein potassium bitartrate is reacted with equimolar quantity of lime and phosphoric acid to produce mono potassium phosphate.

5. The process as claimed in claim 1, wherein insoluble tartrate salt is converted into soluble tartrate salt by reacting calcium tartrate with sodium carbonate.

6. The process as claimed in claim 1, wherein tartaric acid is recycled as disodium tartrate.

7. The process as claimed in claim 1, wherein the pH of the reaction mixture in step (i) is maintained in the range of 12.5-13.5.

8. The process as claimed in claim 1, wherein purging of carbon dioxide in step (ii) is done till the pH reaches 8.5.

9. The process as claimed in claim 1, wherein the pH in step (iv) is maintained in the range of 2.8 to 2.9.

* * * * *